United States Patent [19]
Kao

[11] Patent Number: 5,864,462
[45] Date of Patent: Jan. 26, 1999

[54] SPARE BATTERY CONTAINING MEANS IN A PERSONAL COMPUTER

[76] Inventor: Yu-Jen Kao, 2Fl., 2, Lane 235, Bao Chiao Road, Hsin Tien, Taiwan

[21] Appl. No.: 896,436

[22] Filed: Jul. 18, 1997

[51] Int. Cl.$^6$ .............................. G06F 1/16; H01M 2/00
[52] U.S. Cl. .......................... 361/683; 429/100; 429/123
[58] Field of Search .................................. 361/680–686; 364/708.1; 429/96–100, 123, 1; G06F 1/16

[56] References Cited

U.S. PATENT DOCUMENTS

| | | | |
|---|---|---|---|
| 5,058,045 | 10/1991 | Ma | 364/708.1 |
| 5,075,182 | 12/1991 | Weber | 429/1 |
| 5,729,478 | 3/1997 | Ma et al. | 364/708.1 |

*Primary Examiner*—Lynn D. Feild
*Attorney, Agent, or Firm*—Rosenberg, Klein & Bilker

[57] ABSTRACT

The subject invention relates to a type of spare battery box for PC, comprising an opening on the expansion slot plate on a PC casing; said opening accommodating a battery box; the inside of said battery box forms a battery chamber to accommodate a battery; on the inside wall of the battery chamber are fixed with two guide plates that can be connected by contact with the two battery poles; the two guide plates have guide wires and a connector; said connector can be plugged to the connector for outside battery on the main board; so that the power from the battery can be transmitted to the main board; thereby to achieve the function to facilitate replacement of the battery.

6 Claims, 7 Drawing Sheets

SPARE BATTERY CONTAINING MEANS IN A PERSONAL COMPUTER

BACKGROUND OF THE INVENTION

The subject invention relates to a type of spare battery box for personal computer, particularly to a type of battery box to be fixed on an expansion slot plate to facilitate replacement of battery.

The prior art of a conventional PC's main board includes a built-in battery RTC or a battery box fitted onto the main board to supply power to the main board RTC. In case the battery has run down and needs replacement, the whole casing, or even some interface cards, have to be removed; thus casing much inconvenience to the user.

The primary purpose of the subject invention is to provide a type of spare battery box for PC; by reserving an opening on the expansion slot plate on the PC casing; said opening will accommodate a battery box; said battery box comprises a battery chamber to accommodate the battery; inside the battery chamber are fitted with two guide plates that can be connected by contact with the two electrodes of the battery; the two guide plates have guide wires and a connector; said connector can be plugged to the connector for outside battery on the main board, so the battery power can be transmitted to the main board; when the battery has run down and needs replacement, all the user has to do is to pull out the battery box for easy replacement procedure; so the user may enjoy such a convenience.

To enable better understanding, the designing approach and functions to achieve the above purpose are described in details below with drawings:

BRIEF DESCRIPTION OF NUMERALS

| | |
|---|---|
| 10 expansion slot plate | 11 tightening hole |
| 12 opening | 13 battery box |
| 14 battery chamber | 15 guide plate |
| 16 guide plate | 17 guide wire |
| 18 guide wire | 19 connector |
| 20 puller | 21 catch piece |
| 22 door plate | 23 screw |
| 24 battery | |

Figure 1:
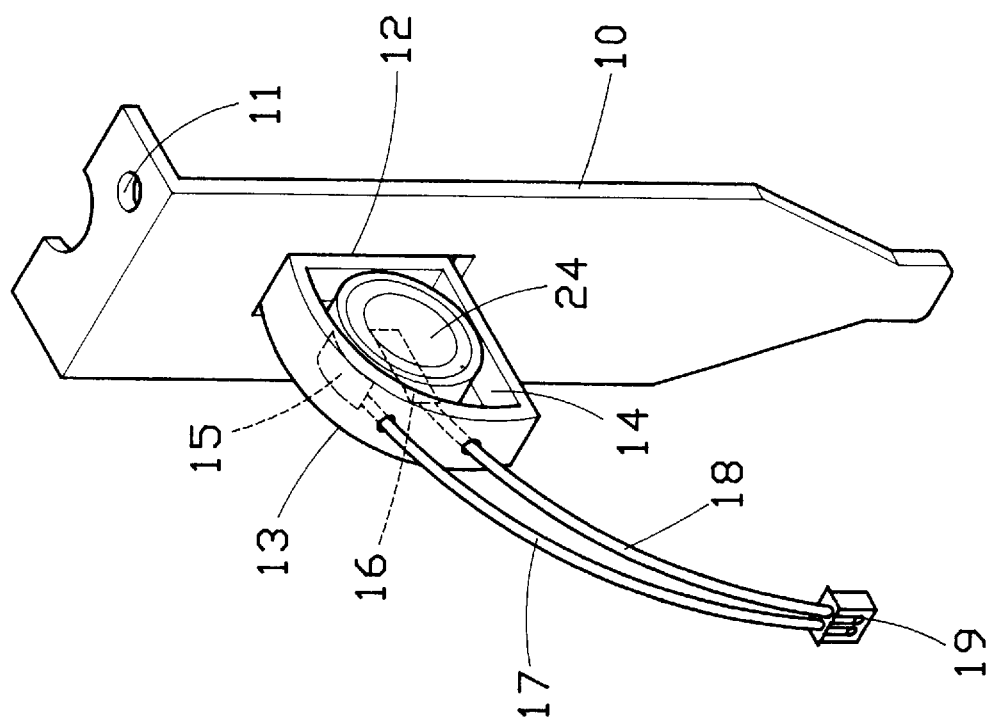
FIG. 1 is the perspective view of the first embodiment of the subject invention.
Figure 2:
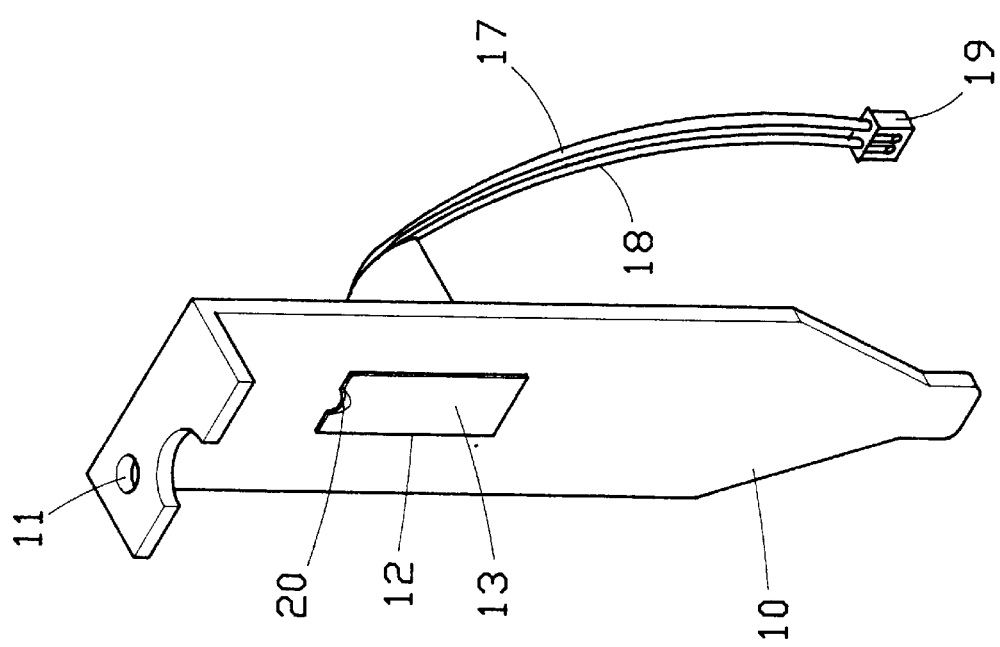
FIG. 2 is the perspective view of the first embodiment of the subject invention from another angle.
Figure 3:
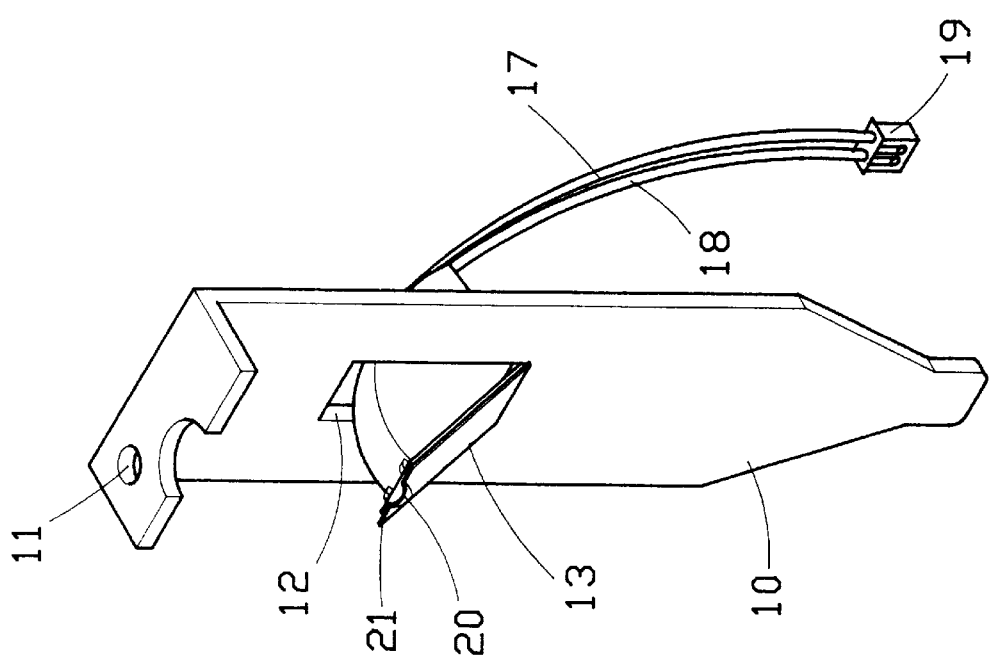
FIG. 3 is the perspective view of the first embodiment of the subject invention with the battery box pulled out.

Referring to FIGS. 1, 2 and 3 which illustrate the first embodiment of the subject invention of spare battery box, so configured to include an opening 12 on the expansion slot plate 10 at the rear of a PC casing; said opening 12 comprising a battery box 13; said battery box in an arc shape with its bottom edge joined to a hinge on the expansion slot plate 10; so that said battery box 13 can be turned outwards from said hinge; one side of said battery box 13 is opened to accommodate a hollow battery chamber 14; said battery serves to accommodate a battery 24; on the inside wall of the battery chamber 14 are fitted with two conductive guide plates 15,16; the positive and negative poles of the battery 24 in the battery chamber 14 can be connected by contact with the two guide plates 15,16; the two guide plates 15,16 are respectively connected to two guide wires 17,18; the other ends of the two guide wires 17,18 are joined to a connector 19; on the free edge of the battery box 13 can have a jutted puller and two catch pieces 21; said battery box 13 can be fitted into the opening 12 (as shown in FIGS. 1 and 2); and the two catch pieces 21 can be used to catch on the inside edge of the opening 12; so that the battery box 13 can be secured to the opening 12; said battery box 13 can be turned out of the opening 12 by pulling the puller 20 out from the hinge (as shown in FIG. 3) to facilitate replacement of the battery 24.

Figure 4:
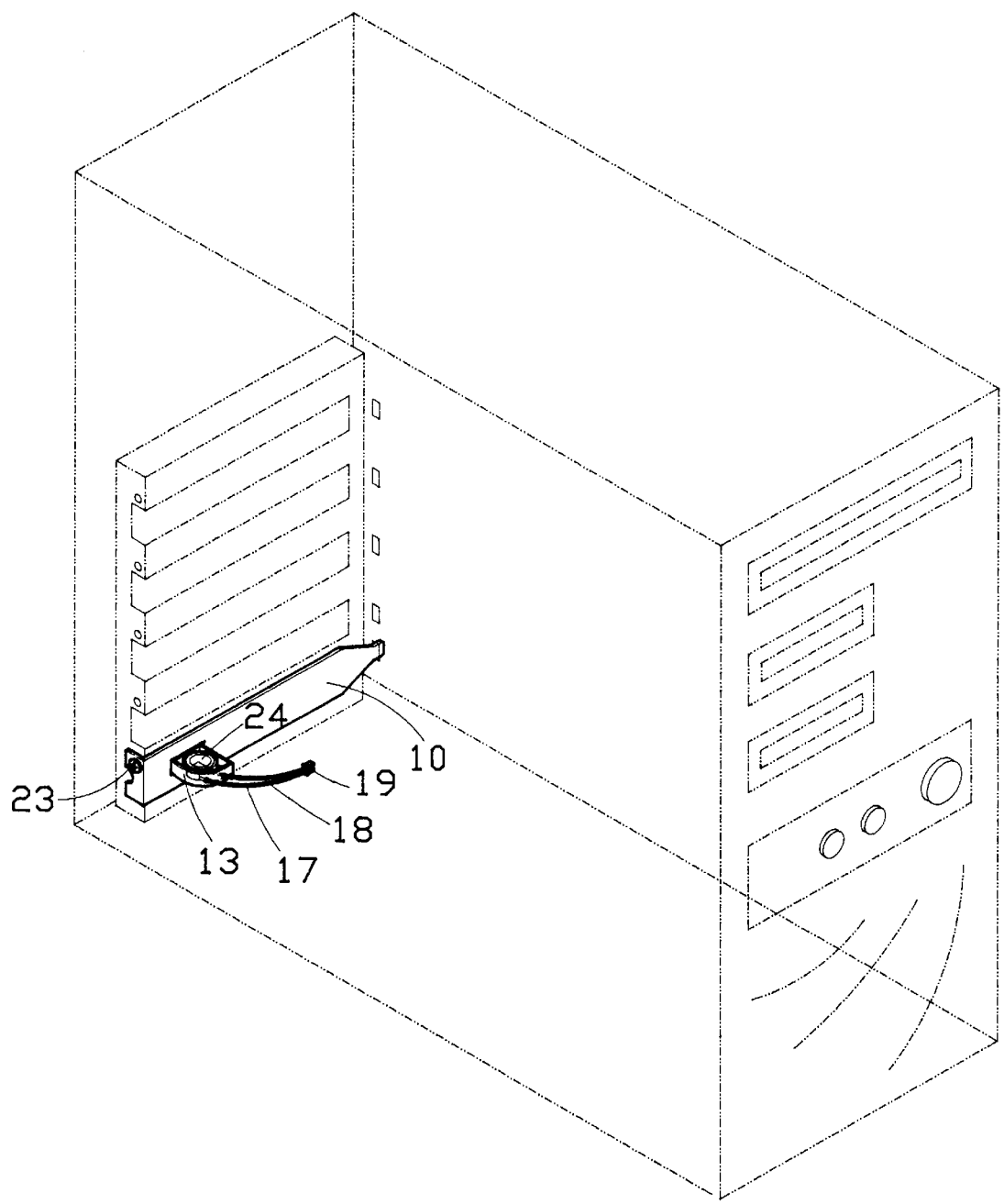
FIG. 4 is the perspective view of the first embodiment of the subject invention being installed on the PC casing.

Referring to FIG. 4, said expansion slot plate 10, just like a normal expansion slot plate, is fixed onto the expansion slot at the rear of the PC casing, and is tightened by a screw 23 penetrating the tightening hole 11 on the expansion slot plate 10; the connector 19 joining the ends of the guide wires 17,18 can be plugged to a connector (not shown in the diagram) for outside battery on the PC's main board; the power of the battery 24 can be supplied from the guide plates 15,16; the guide wires 17,18 and the connector 19 to the main board; by so unique a design to facilitate the user that, in case the battery 24 has run down and needs replacement, all the user has to do is turn out the battery box 13 to easily and comfortably replace the battery 24.

Figure 5:
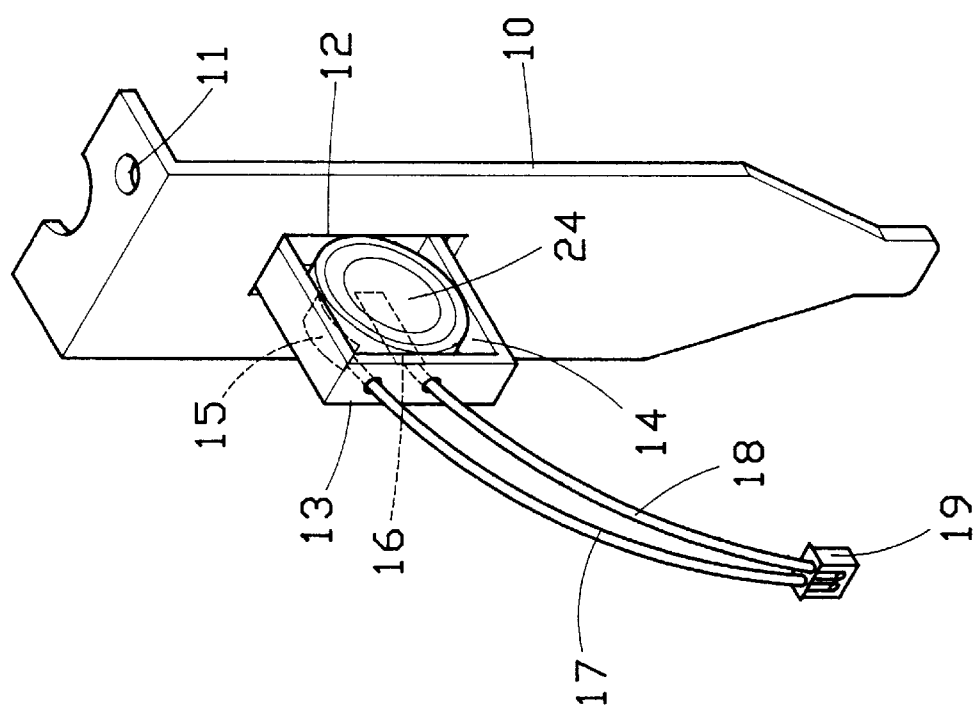
FIG. 5 is the perspective view of the second embodiment of the subject invention.
Figure 6:
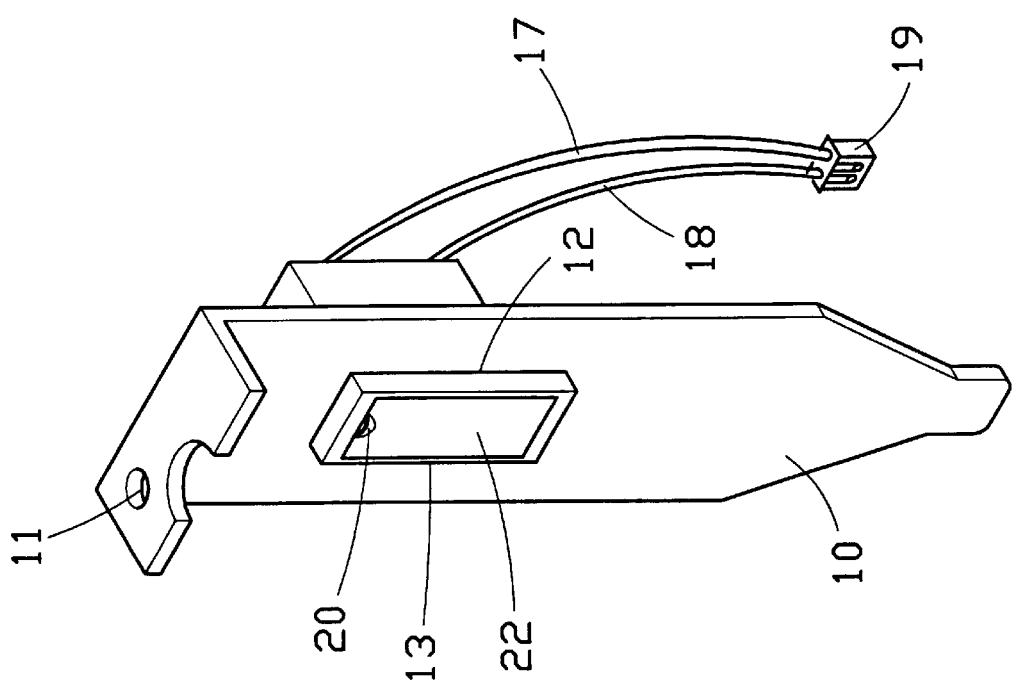
FIG. 6 is the perspective view of the second embodiment of the subject invention from another angle.
Figure 7:
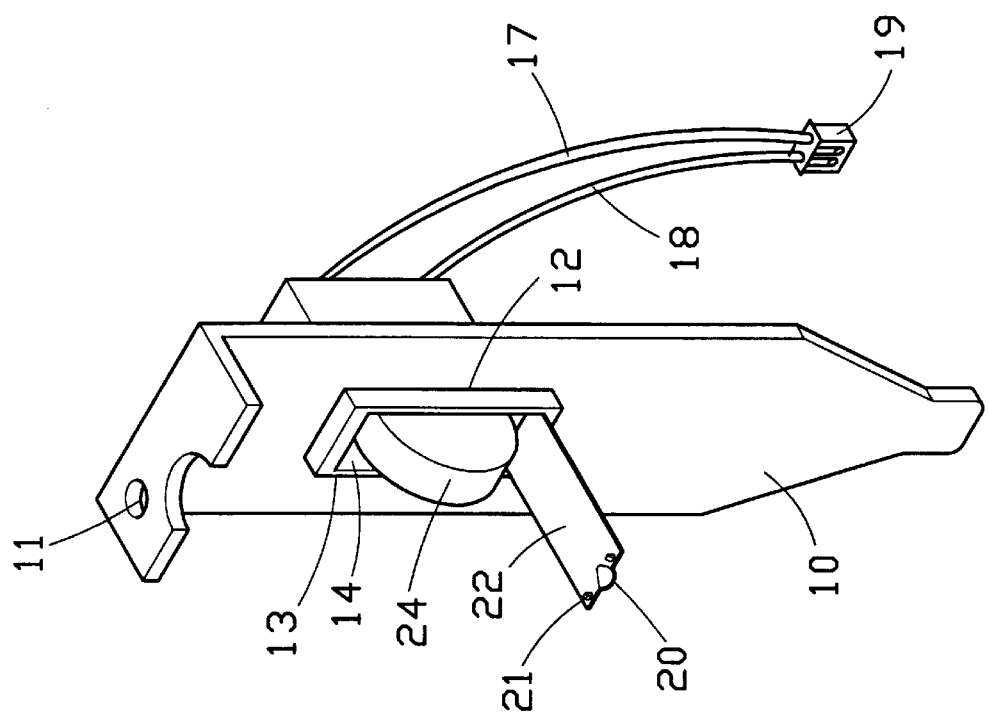
FIG. 7 is the perspective view of the first embodiment of the subject invention with the battery box pulled out.

Referring to FIGS. 5, 6 and 7 which illustrate the second embodiment of the subject invention of spare battery box for PC, wherein the subject invention includes an opening 12 on the expansion slot plate 10; inside said opening is fixed with a battery box 13; said battery box in a square shape is fixed on the expansion slot plate 10; the outside of said battery box 13 is designed as a opening door with a door plate 22; said door plate 22 has its bottom edge joined by a hinge onto the battery box 13; so that said door plate 22 can be opened from the hinge at the bottom; so the outside of the battery box 13 is opened; the inside of said battery box 13 forms a hollow battery chamber 14; said battery chamber 14 accommodates a battery 24; on the inside wall of the battery chamber 14 are fixed with two guide plates 15,16 which are made of conductive materials; the positive and negative poles of the battery 24 in the battery chamber 14 can be connected to the two guide plates 15,16; the two guide plates 15,16 are respectively connected to two guide wires 17,18; the other ends of the two guide wires 17,18 are connected to a connector 19; on the free edge of the door plate 22 are a jutted puller 20 and two catch pieces 21; said door plate 22 can be fitted on the opening side of the battery box 13 (as shown in FIGS. 5 and 6); by catching the two catch pieces 21 to the inner edge of the opening, the door plate 22 can be secured on the opening side; said door plate 22 can also be turned out from the bottom hinge (as shown in FIG. 7) to facilitate replacement of the battery 24. Said expansion slot plate 10, just like the first embodiment, can be tightened to the expansion slot on a PC casing; the connector 19 at the ends of the guide wires 17,18 can be plugged to the connector for outside battery on the main board; so power supply from the battery 24 can be transmitted from the guide plates 15,16, the guide wires 17,18 and the connector 19 to the main board.

Summing up, the subject invention, with its improvement on conventional PC's that involve such problem and inconvenience when the power supply battery needs replacement, does have its novelty and inventive step that will fully satisfy the requirements for a patent, therefore this application is filed in accordance with the Patent Law to protect the subject inventor's rights and interests. Your favorable consideration should be appreciated.

It is hereby declared that the above description, covering the preferred embodiments of the subject invention, should not be based to limit or restrict the subject claim, and that all equivalent configurational variations deriving from the subject description with its drawings and contents should reasonably be included in the subject claim.

I claim:

1. A spare battery containing means for use with a personal computer (PC), comprising;

an expansion slot plate coupled to a PC casing, said expansion slot plate having an opening formed therethrough;

a battery box having one side thereof hinged to said expansion slot plate for passage through said opening to extend externally from the PC to facilitate replacement of a battery, one side of said battery box being hollow to form a battery chamber therein, said battery chamber receiving a battery therein;

a pair of guide plates fixed to an inside wall of said battery chamber for respectively contacting two poles of the battery received in said battery chambers;

a pair of guide wires, each of said pair of guide wires having a first end connected to a respective one of said pair of guide plates; and, a connector coupled to a second end of each of said pair of guide wires, said connector being plugged into an external battery connection on a main board of the PC for transmitting power from the battery to the main board.

2. The spare battery containing means as recited in claim 1, wherein said battery box includes an edge portion having a puller extending therefrom to rotate said battery box about said hinge.

3. The spare battery containing means as recited in claim 1, wherein said battery box includes an edge portion having catch pieces extending therefrom to catch an inner edge of said opening.

4. A spare battery containing means for use with a personal computer (PC), comprising;

an expansion slot plate coupled to a PC casing, said expansion slot plate having an opening formed therethrough;

a battery box having an outer side and a door plate hingedly coupled to said outer side to facilitate replacement of a battery received in a battery chamber formed in said battery box;

a pair of guide plates fixed to an inside wall of said battery chamber for respectively contacting two poles of the battery received in said battery chambers;

a pair of guide wires each of said guide wires having a first end connected to a respective one of said pair of guide plates; and, a connector coupled to a second end of each of said pair of guide wires, said connector being plugged into an external battery connection on a main board of the PC for transmitting power from the battery to the main board.

5. The spare battery containing means as recited in claim 4, wherein said door plate has a puller extending therefrom to facilitate pulling of said door plate.

6. The spare battery containing means as recited in claim 4, wherein said door plate has catch pieces extending therefrom to facilitate catching an inner edge of said opening.

* * * * *